United States Patent
Suruceanu et al.

(10) Patent No.: US 8,946,588 B2
(45) Date of Patent: Feb. 3, 2015

(54) METHOD AND APPARATUS FOR IMPROVING RELIABILITY OF A MACHINING PROCESS

(75) Inventors: Grigore Suruceanu, Chavannes-près-Renens (CH); Benjamin Carron, Savigny (CH)

(73) Assignee: Synova SA, Ecublens (CH)

( * ) Notice: Subject to any disclaimer, the term of this patent is extended or adjusted under 35 U.S.C. 154(b) by 795 days.

(21) Appl. No.: 13/130,429

(22) PCT Filed: Nov. 20, 2009

(86) PCT No.: PCT/CH2009/000372
§ 371 (c)(1),
(2), (4) Date: Jun. 24, 2011

(87) PCT Pub. No.: WO2010/057328
PCT Pub. Date: May 27, 2010

(65) Prior Publication Data
US 2011/0240615 A1 Oct. 6, 2011

(30) Foreign Application Priority Data
Nov. 21, 2008 (EP) .................................... 08405287

(51) Int. Cl.
*B23K 26/00* (2014.01)
*B23K 26/14* (2014.01)
(Continued)

(52) U.S. Cl.
CPC ........... *B23K 26/1417* (2013.01); *B23K 26/381* (2013.01); *B23K 26/4005* (2013.01);
(Continued)

(58) Field of Classification Search
USPC .......................................... 219/121.6–121.86
See application file for complete search history.

(56) References Cited

U.S. PATENT DOCUMENTS

| 5,902,499 A | 5/1999 | Richerzhagen |
| 6,025,571 A | 2/2000 | Walters et al. |

(Continued)

FOREIGN PATENT DOCUMENTS

| EP | 1 859 890 A1 | 11/2007 |
| EP | 1 918 061 A1 | 5/2008 |

(Continued)

OTHER PUBLICATIONS

Jp2007029980 english machine translation, Feb. 2007.*
(Continued)

*Primary Examiner* — Sang Y Paik
(74) *Attorney, Agent, or Firm* — Birch, Stewart, Kolasch & Birch, LLP

(57) ABSTRACT

A process for providing a protection against damages in a machine head is claimed. The process comprises the following steps: First a blind steel plate (protection plate 20) is fixed to a protection chamber (10). Then the transparent liquid jet (WJ) guided laser beam (LB) is started, which drills a transit-hole into it. This protection plate (20) has the transit-hole (23) precisely arranged on the optical axis. Therefore no further alignment is required. Further an apparatus for treating a work piece by means of a laser beam (LB) which is guided in a transparent liquid jet (WJ) is claimed. The apparatus comprises a protection chamber (10) mounted on the output (5) of a coupling unit (CU) and a protection plate (20) replaceable fixed to the first chamber (10) protecting the outlet (15) of the first chamber (10) from sputtered debris.

17 Claims, 3 Drawing Sheets

(51) Int. Cl.
*B23K 26/38* (2014.01)
*B23K 26/40* (2014.01)

(52) U.S. Cl.
CPC ........... *B23K26/401* (2013.01); *B23K 26/4025* (2013.01); *B23K 26/4055* (2013.01); *B23K 26/4065* (2013.01); *B23K 26/408* (2013.01)
USPC .................................. 219/121.71; 219/121.84

(56) References Cited

U.S. PATENT DOCUMENTS

| | | | |
|---|---|---|---|
| 6,335,507 B1 * | 1/2002 | Nakata et al. | 219/121.67 |
| 8,134,098 B2 * | 3/2012 | Muratsubaki et al. | 219/121.67 |
| 2007/0278195 A1 | 12/2007 | Richerzhagen et al. | |
| 2008/0169275 A1 * | 7/2008 | Koseki et al. | 219/121.75 |

FOREIGN PATENT DOCUMENTS

| | | |
|---|---|---|
| JP | 6-51235 A | 2/1994 |
| JP | 2007-29980 A | 2/2007 |
| JP | 2008-519691 A | 6/2008 |
| WO | WO 2006/050622 A1 | 5/2006 |
| WO | WO 2007/013293 A1 | 11/2007 |

OTHER PUBLICATIONS

Chinese Office Action mailed Aug. 27, 2013 for Application No. 200980155059.5 (English translation).

Japanese Office Action mailed Oct. 1, 2013 for Application No. 2011-536720 (English translation).

* cited by examiner

METHOD AND APPARATUS FOR IMPROVING RELIABILITY OF A MACHINING PROCESS

TECHNICAL FIELD

The invention relates to a process for improving reliability of a machining process for a work piece, said machining process comprising the steps of
- a) launching a transparent liquid jet along an optical axis to the work piece by means of expulsion of liquid through a nozzle of a machine head,
- b) coupling a laser beam into said liquid jet by means of a coupling unit so as to generate a liquid jet guided laser beam,
- c) machining said work piece by said liquid jet guided laser beam, In addition, the invention relates to an apparatus for performing said machining process, comprising
- a) a machine head with a coupling unit for coupling a laser beam into a liquid jet to generate the liquid jet guided laser beam,
- b) an outlet in the machine head through which the liquid jet guided laser beam leaves the machine head for treating the work piece,
- c) a protection shield replaceable fixed to the machine head and mounted at a distance from said outlet and having a transit-hole for passage of the laser beam guiding liquid jet.

BACKGROUND ART

It is known from U.S. Pat. No. 5,902,499 (Synova) how a laser beam with sufficient high energy for ablating material (particularly for cutting different types of materials) can be coupled into a water jet (or into any jet of an appropriate transparent liquid medium). The laser light is optically guided in the water jet in the same way as a light beam in an optical fibre and impinges on the work piece with an effective diameter substantially corresponding to the diameter of the water jet.

The main elements of the so called LWJ® technology consist in a lens system focussing the laser beam, a relatively thin high-pressure water chamber (also called coupling unit) and a nozzle with a small diameter. A typical nozzle diameter is 20 to 150 micrometers. In addition to its guiding properties, the water jet serves as a cooling medium for the machined part of the work piece and removes in a very efficient way the ablated material, leading to very good machining quality.

It is known from WO 2006/050622 (Synova) that the stability of the water jet plays a crucial role for achieving a good quality cut and an efficient machining process. One important characteristic of the water jet is its coherence length i.e. the travel distance in which the jet remains laminar. This is also the region where the water jet has its best light guiding properties. Micromachining is possible as long as the work piece is located between the nozzle and the coherence length. This distance is called working distance.

The working distance is known to be about 1000 times the nozzle diameter. Since the nozzles diameter is in the range of 20 to 150 micrometers, the working distance varies from about 20 mm to 150 mm. Although such distances are well suited for most machining processes, there are some specific applications, which require the placement of the workpiece close to the nozzle. From a theoretical point of view, there are no limitations regarding the minimum distance from the nozzle to the workpiece. However, experience shows that sometimes the following phenomena occur:

1. Perturbation of the water jet stability due to feedback effects as a result of interaction with the work piece. The perturbation of the water jet can be partially associated with the generation of surface waves (oscillations). These oscillations can propagate in the vertical direction, toward the nozzle. It may even reach the nozzle orifice.
2. Suction of the ablated material and its deposition on the backside of the nozzle. The impinging water jet has very high speed, which creates a de-pressurization around the jet, which leads to suction of the particles from the ablated material. The particles from the ablated material may also reach the nozzle orifice region.
3. Back reflected laser and plasma light, during the machining process of the work piece.

Due to these phenomena the lifetime of the nozzle often is reduced compared to longer working distances and that the water jet stability is less than expected for short working distances. These effects are particularly a problem when a laser beam with high optical power is required.

SUMMARY OF INVENTION

It is an object of the invention to overcome the above mentioned problems of the prior art and to provide a process and a machine that works at elevated laser power levels with high stability of the liquid jet guided laser beam and better lifetime of the nozzle.

The solution of the problem is achieved according to the claim 1 by the following steps:
- a) fixing a blind protection shield blank to a front of the machine head prior to launching said transparent liquid jet,
- b) generating said liquid jet guided laser beam and impinging it on the blind protection shield blank,
- c) drilling a transit-hole into the blind protection shield blank by means of the liquid jet guided laser beam, said transit-hole having a minimal size for allowing the liquid jet guided laser beam to transit without hindrance.

Firstly a blind protection shield blank is fixed to a front of the machine head prior to launching said transparent liquid jet guided laser beam. "Blind" means, that the protection shield does not have a transit-hole for the liquid jet. (Never the less, the protection shield blank may have some holes or openings for other purposes.) The protection shield is fixed to the front of the machine head so that there is a well defined and stable mechanical connection between the head and the shield. The mechanical connection makes sure that rapid motions of the machine head, vibrations or the like are not able to alter the geometric relation between the protection shield and the machine head.

Secondly, the transparent liquid jet guided laser beam is launched (i.e. the machine is turned on for working). Because the protection shield does not have a transit-hole for the liquid jet, the liquid jet guided laser beam impinges on the blind protection shield blank. The liquid is transparent for the wavelength of the laser beam in order to minimize absorption of the laser beam by the liquid. The liquid is preferably water or a liquid with low absorption coefficient such that the laser beam travelling in the liquid jet substantially does not lose power.

Thirdly, a transit-hole is drilled into the blind protection shield blank by means of the liquid jet guided laser beam. Because the position of the protection shield is fixed with respect to the machine head (and therefore with respect to the liquid jet guided laser beam) the transit-hole has a size which substantially corresponds to the cross-section of the transparent liquid jet. The protection shield with the transit hole serves as a low cost and precise protection shield of the liquid jet. The transit-hole has a minimal cross-section for allowing the liquid jet guided laser beam without hindrance.

This process provides a cost effective way to reduce the risk that ablated material of the work piece is deposited on the front face of the machine head and that such ablated material may be transported into the machine head and may e.g. settle on the nozzle. Because the transit-hole is drilled in-situ (i.e. it is produced only after fixing the plate to the machine head) it is automatically in line with the axis of the liquid jet. It is not necessary to provide alignment mechanics even though the transit-hole is almost as small as the water jet.

The drilling is very quick if the thickness of the protection shield is sufficiently small. The shield may be replaced every now and then. The replacement does not require special alignment skills of the user.

The treatment of the work piece may start substantially without interruption as soon as the step of drilling said transit-hole is completed. The drilling may take less than one second (e.g. a few tenths of a second).

In particular, the liquid jet needs not to be halted after the drilling is finished. Under normal circumstances only the laser beam is interrupted for a short time in order to be able to move the machine head to the desired point of action.

According to a preferred embodiment of the invention a focussing lens system which focuses the laser beam into the nozzle that generates the liquid jet is cooled. This stabilizes the focal point of the laser beam with respect to the transparent liquid jet. It was found that the laser focal plane may change its position during operation when using a high power laser. Small misalignments may lead to instabilities of the liquid jet and eventually to nozzle damages on the long run.

The transparent liquid jet which guides the laser beam is preferably surrounded with a gas jet as known from WO 2006/050622 (Synova). This is achieved by means of a first chamber after the nozzle. The gas is injected into the first chamber through inlets in the side walls (i.e. the peripheral walls) while the liquid jet travels through the centre of the chamber and exits through a gas nozzle together with the gas. According to a preferred embodiment of the present invention the transparent liquid jet guided laser beam (which is surrounded with said gas jet) is transmitted though a second chamber (protection chamber). The second chamber is more or less closed but is vented to the surrounding in order to avoid pressure differences that could induce a debris transport back to the liquid jet nozzle. The protection chamber acts as a buffer for debris (i.e. ablated material etc.) and also as a protection against accumulated water droplets, which may disturb the water jet as well.

The apparatus for treating a work piece by means of a laser beam which is guided in a transparent liquid jet has a machine head that comprises a coupling unit for coupling a laser beam into a liquid jet to generate the liquid jet guided laser beam. The machine head shows an outlet through which the liquid jet guided laser beam leaves the machine head for machining the work piece. The protection plate is replaceable fixed to the machine head and mounted at a distance from said outlet and has a transit-hole for passage of the laser beam guiding liquid jet. The transit-hole is drilled in-situ and therefore has a minimal size for allowing the liquid jet guided laser beam to transit without hindrance.

The coupling unit may basically consist of a transparent liquid chamber having an entry window for the laser beam and a nozzle with a predetermined diameter for generating the transparent liquid jet. The nozzle is arranged oppositely to the entry window in such a way that the laser beam only travels a short distance through the liquid chamber prior to entering the gorge of the nozzle.

Preferably, a first chamber is mounted adjacent to and downstream of the nozzle. It has an inlet for the laser beam guiding liquid jet and an outlet (mouth piece). This chamber may be used as a protection chamber or as a chamber for surrounding the liquid jet by a gas jacket.

The protection shield is replaceable fixed to the first chamber (i.e. to the front face of the chamber). "Replaceable" means that there are screws, bores or strong clamps to hold the protection plate in place during the machining of the work piece and that the screws, clamps etc. can be opened and closed by hand or by tools (screwdriver etc.) to replace a used protection plate by a new blind plate. The protection shield is mounted at a distance from the outlet of the first chamber and has a hole for passage of the laser beam guiding transparent liquid jet and for protecting the nozzle from debris sputtered from the treated work piece. The protection shield has the effect of stabilization of the liquid jet which results in better machining quality (high precision).

The hole in the protection shield has a diameter that is in the range of the diameter of the nozzle. During use the transit-hole may slowly grow. Generally speaking, it is not bigger than three times the diameter of the nozzle. Immediately after the in-situ drilling the transit hole may typically be up to 10% more in diameter. (The diameter of the liquid jet is usually slightly less than the diameter of the nozzle.) After a certain period of time the hole will successively wear out because the protection shield is not very massive. Normally the transit hole may have a diameter that is up to 1.5-2.0 times the diameter of the liquid jet. But even in this case, the effect of the protection shield is noticeable. Usually the protection shield is replaced at the same time as the nozzle is replaced.

The protection shield is preferably made of stainless steel and has a thickness of at most 0.3 mm, more preferably of about 0.1-0.2 mm. The steel does not have to be of a high quality. The material of the protection shield and its preferred thickness depend on the power of the laser. It should be intended to choose thickness and quality in relation to the laser power such that the transit hole can be drilled within less than a second, preferably less than 0.5 seconds and most preferably in about 0.1-0.2 seconds or even less. When a laser with an average power of 200 W is used the blind protection shield may have a thickness of 0.3 mm.

The thickness of the protection shield may be higher, if a more durable protection is desired. It is also possible to select a different metal such as alumina (Al2O3). Also it is possible to choose a non-metal material provided it is sufficiently heat resistant. For example heat resistant plastics, like PEEK. Additionally the protection plate can be fabric or made of fibres wheras metal as well as plastics can be used.

The protection shield is preferable a protection plate, particularly a steel plate. A protection plate has the advantage that it is flat. Therefore the manufacturing of such a protection pate is simple and at low costs.

Alternative the protection shield is curved or has a Geometry different of being flat. It is as well imaginable to have plate like shield, flat or curved, with different thickness. The thickness may change in steps or continuously.

The nozzle has a diameter of typically not more than 150 µm, preferably of less than 100 µm. The invention is most useful for nozzle diameters in the range of about 80 µm or less because conventional protection measures are more difficult to apply for small diameters or are less effective. (A deviation of e.g. 15% from the indicated nozzle diameter is still within the scope of "about 80 µm".)

The protection shield may be fixed in any manner that provides a rigid connection between the shield and the machine head. It is most advantageous to provide the blind protection shield with e.g. punched holes. The holes are designed to fit on bolts (e.g. 2 bolts) attached to the machine head. The machine head may have appropriate bores to insert and fix the bolts or screws. The shield may then be fixed by screws without any need for a precise positioning. The punched holes may have a diameter of a few millimeters and there may be a clearance of several tenths of millimeters between the hole and the bolt. The point is that the shield is blind when it is initially fixed and does not need any particular adjustment or alignment with respect to the liquid jet, so that the shield may be fixed by the screws in any position.

If the nozzle is replaced (because of wear out) the protection shield is replaced also. According to the preferred embodiment of the invention, the machine head is constructed in such a way that the protection shield (after being fixed) is in a rigid geometric position with respect to the nozzle. Because the transit hole is so narrow a slight change of the path of the liquid jet may entail that a part of the border of the transit hole is drilled away by the (powerful) laser beam.

Preferable the first chamber is a gas chamber, which is mounted adjacent to and downstream of the liquid jet nozzle. The gas chamber having an inlet for the liquid jet guided laser beam, an inlet for gas and a gas nozzle outlet for surrounding the liquid get guided laser beam with a gas jacket.

The hole drilled into the protection shield initially has the diameter which is about 10% larger than the water jet diameter. The "layer" of the gas (e.g. Helium) namely the cylindrical stream of gas emanating from the gas nozzle surrounding the water jet is about 20-40 um thick. During machining process the diameter of the hole is gradually increasing. Surprisingly it has been found that the hole in the protection shield does not have a big impact on dynamics of the liquid jet.

The apparatus may comprise a protection chamber arranged adjacent to and downstream of the first chamber. The protection chamber is relatively flat and is vented at the peripheral walls. The thickness of protection the chamber is about 10 mm but could be less (5-10 mm).

The protection chamber preferably has a funnel part having its narrow end directed upstream with respect to the transparent liquid jet guided laser beam. The wide end of the funnel is directed downstream and being followed by a channel. The design of the funnel ensures stable movement of the water jet surrounded by the assist gas. ("Upstream" means towards the nozzle and "downstream" means towards the work piece.)

The protection chamber may have a depth (i.e. a dimension parallel to the direction of the transparent liquid jet guided laser beam) of not more than about 10 mm. The design of the channel ensures stable movement of the water jet surrounded by the assist gas.

The front end face of the protection chamber is advantageously cone-shaped to form a recess or indentation. The protection shield may be fixed to the rim of the cone-shaped recess so that there is a passage (free space) between the protection shield and the cone-shaped recess. Passages may be on both sides of the protection shield so that the water may easily flow away during drilling of the transit hole.

When using a cooling system for the focussing lens system a temperature stabilization is provided to the periphery and/or the front face of the lens system.

The following description of the preferred embodiments and the combination of the claims contain further advantageous features and effects of the invention.

SHORT DESCRIPTION OF THE DRAWINGS

The drawings, which are used to explain more details of the invention, show the following aspects:

FIG. 1b shows a magnified section of FIG. 1a.

Figure 3A:
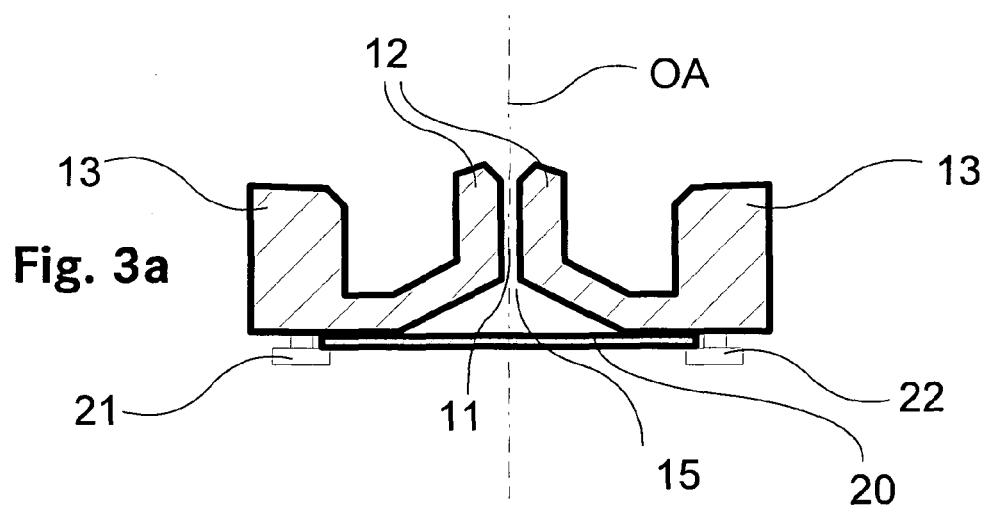
Figure 3B:
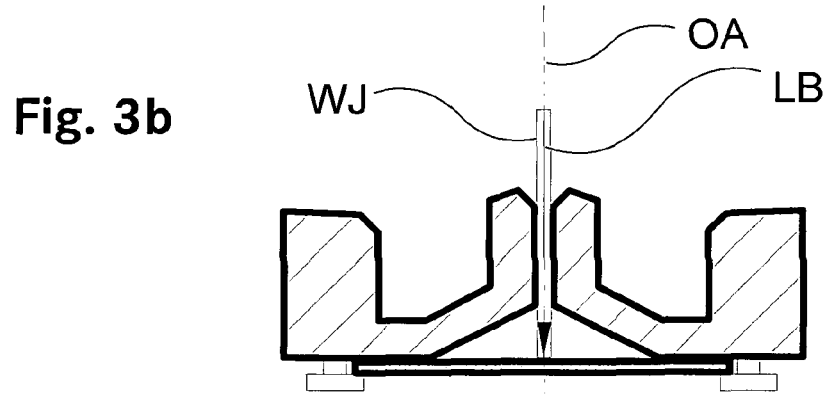
Figure 3C:
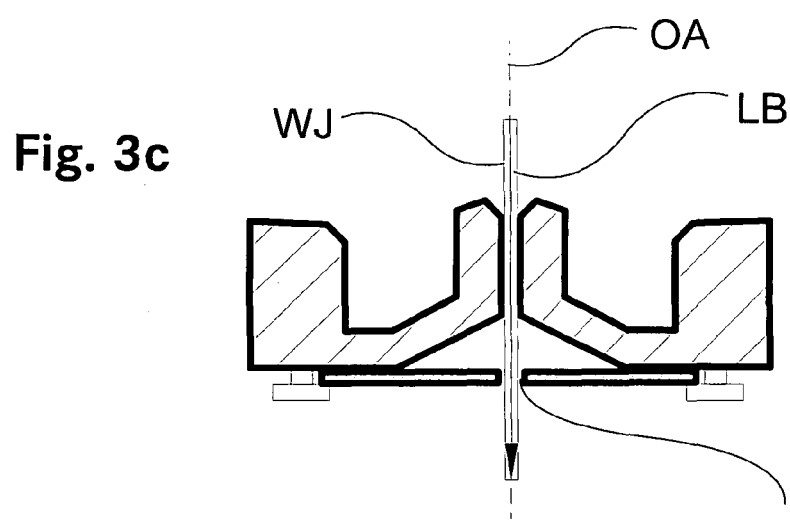

FIG. 3a-c shows the process of drilling a hole into the protection shield according to the invention.

Same reference numerals designate identical parts in the Figures.

PREFERRED EMBODIMENTS

Figure 1A:
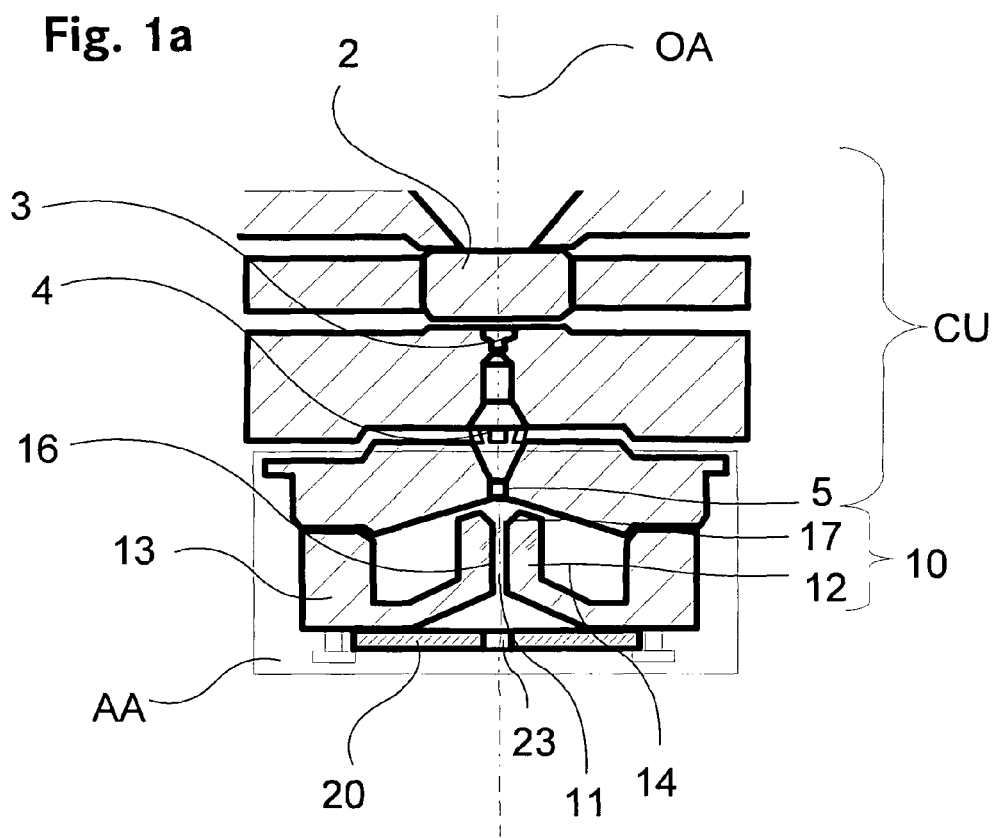
FIG. 1a shows a cross section of a protection shield attached to a protection chamber, which itself is attached to a coupling head used in a water jet laser guided technology.

FIG. 1a shows a cross section of a protection shield in the form of a protection plate 20 and a protection chamber 10 of the invention mounted on a coupling unit CU using water jet technology. A detailed description of this coupling unit CU can be found in WO 2006/050622 (Synova), especially FIG. 6. For a better understanding a brief summery of the coupling unit CU is given: A laser beam which is propagating along an optical axis OA is transmitted through a window 2 and coupled into a thin water jet generated by a nozzle 3. The water jet guides the laser beam by total internal reflection, similar to a glass fibre. The water jet is produced by a nozzle 3 and its axis is in line with the optical axis OA as well. After the nozzle 3 the water jet guided laser beam passes a gas chamber 4, where a gas jacket is added around the water jet for better stability of the surface of the (cylindrical) water jet. The water jet surrounded with the gas jacket guides the laser beam through an opening 5 of the coupling unit CU.

Figure 1B:
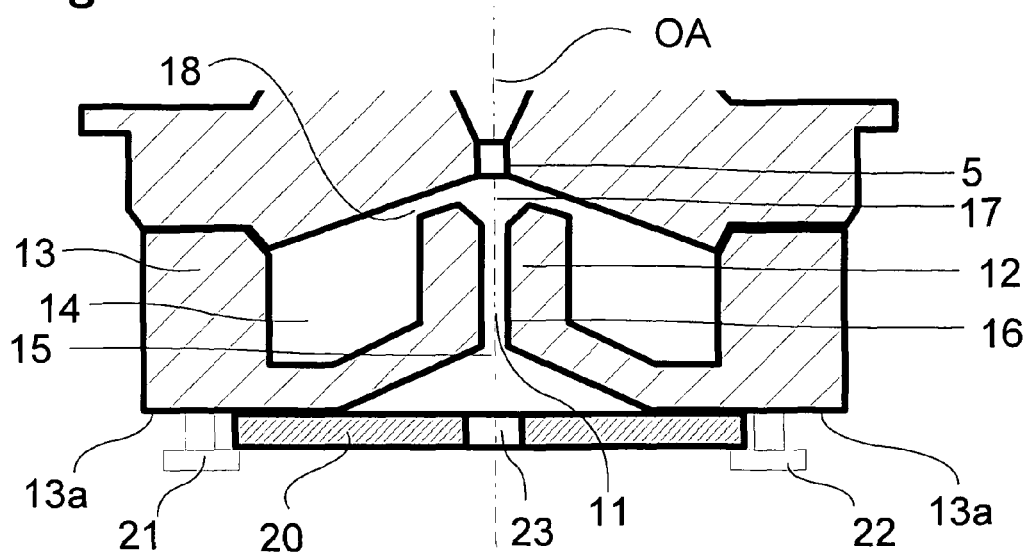

FIG. 1b shows the enlarged framed section AA from FIG. 1a in more detail. It mainly shows the protection chamber 10 and the protection plate 20.

The protection chamber 10 has mainly the shape of a disk with a cylindrical channel 11 at its centre. The channel 11 has an axis of rotational symmetry which is in line with the optical axis OA. The protection chamber 10 is mounted in front of the opening 5 of the coupling unit CU and the channel 11 is in line with the water jet. The channel 11 is formed by an inner pipe 12. Upstream, i.e. towards the coupling unit CU, the channel 11 ends in a small funnel, which works as an inlet 17 of the water jet guided laser beam. At the opposite end, downstream, the channel 11 ends on a broader funnel, which has the shape of a conical outlet 15 of the channel 11. The protection chamber 10 is attached to the coupling unit CU by an outer cylindrical wall 13. Between the outer wall 13 and the inner pipe 12 there is a cavity 14 with an opening towards the coupling unit CU. In that way that the cavity 14 and the laser LH form an empty chamber. In opposite to the outer wall, which is in contact with the coupling unit CU, the inner pipe does not touch the coupling unit CU. Therefore there is a small gap 18 between the pipe 12 and the coupling unit CU. This gap 18 allows pressure regulation between the cavity 14 and the channel 11.

The water jet guided laser beam enters the channel 11 through the inlet 17. Passing the channel 11 the water jet does not touch the walls 16 of the channel 11 and leaves the protection chamber by the outlet 15 of the channel 11 with the gas jacket still intact. The diameter of the channel 11 is substantially larger than the diameter of the nozzle which generates the water jet and may be of the same size as the opening 5 of the coupling unit CU. The channel 11 has a diameter of approximately 200-600 µm, preferably approximately 500 µm. There is no direct link between the diameter of the nozzle and the diameter of the channel 11. The outlet 15 together with the channel 11 protects the coupling unit CU from small particles of ablated material which could be sucked into the opening 5 of the coupling unit CU. Further the channel 11 prevents perturbation of the water jet which could result from feedback effects as a result of the interaction of the water jet with the work piece (not shown).

The protection plate 20 is a rectangular shaped thin metal plate which is mounted on the front of the protection chamber 10 (i.e. downstream of the protection chamber) and perpendicular to the optical axis OA. The upper main surface of the protection plate 20 is in contact with a lower end 13a of the outer wall 13 of the protection chamber 10. The lower main surface of the protection plate 20 faces towards a work piece (not shown). The protection plate 20 is made of stainless steel and has a thickness of preferably about 100 µm. The protection plate 20 is held in place on each side of the rectangular area by two screws 21 and 22 which are screwed into the lower end 13a of the outer wall 13 of the protection chamber 10. There is a hole 23 in the centre of the protection plate 20, in line with the optical axis OA. The hole is produced in-situ by the water jet guided laser beam and has a diameter which is a little bit larger than the diameter of the water jet. In this way the water jet guiding the laser beam passes the protection plate 20 through the hole 23 without being disturbed.

Figure 2A:
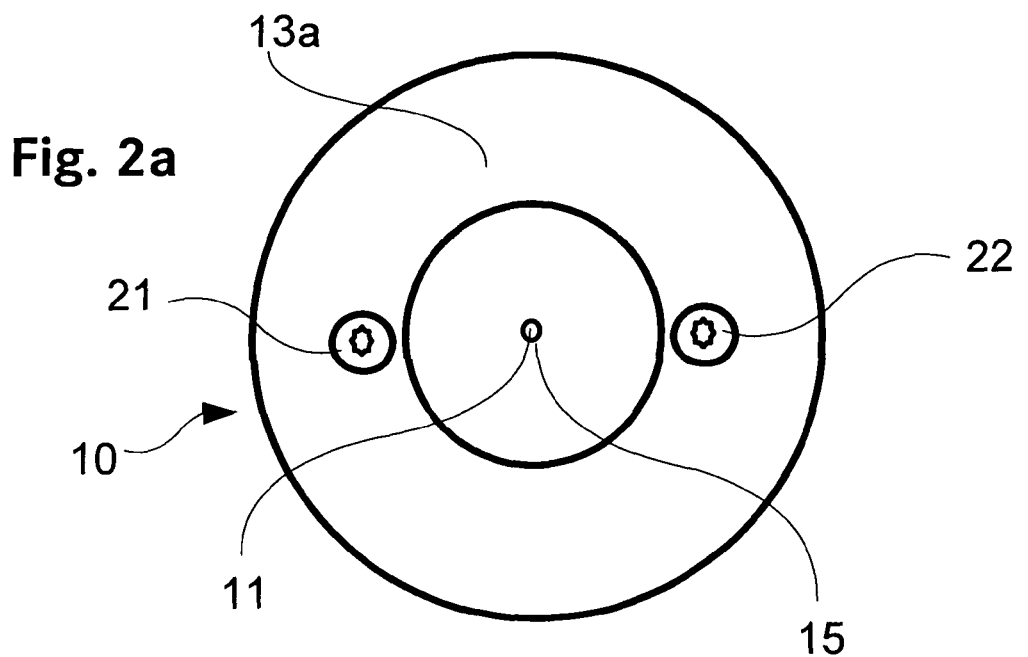
FIG. 2a shows the bottom side of the protection chamber without the protection plate.

FIG. 2a shows the bottom side of protection chamber 10 without the protection plate 20 attached to it. The screws 21 and 22 for holding the protection plate 20 are already screwed in the lower end 13a of the outer wall 13 of the protection chamber 10. The distance between the two screws 21 and 22 is larger than the conical outlet 15 of the channel 11.

Figure 2B:
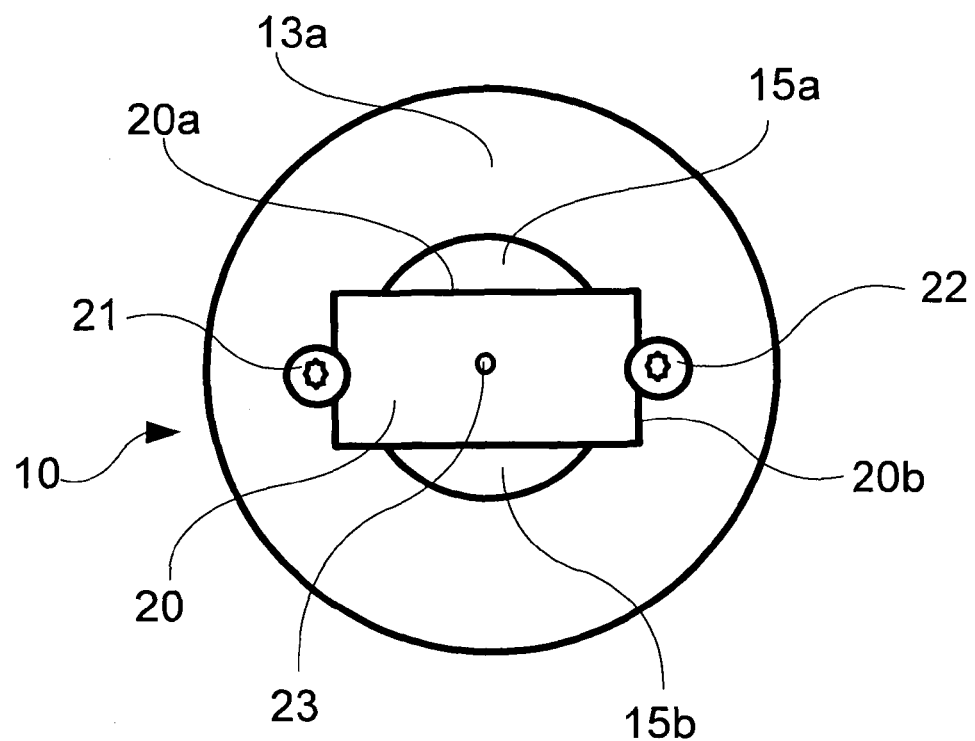
FIG. 2b shows the bottom side of the coupling unit with the protection shield attached to it.

FIG. 2b shows the same view of the protection chamber 10 as FIG. 2a, but with the protection plate 20 attached to it. The dimension of the protection plate 20 is in such a way that a longer side 20a of the rectangular shape protection plate 20 is larger than the conical outlet 15 of the channel 11 and the shorter side 20b is shorter than the conical outlet 15 of the channel 11. Therefore, an open space, formed between the protection plate 20 and the conical outlet 15, is provided with two openings 15a and 15b on each side of the longer side 20a of the protection plate 20. The two screws 21 and 22 are holding in place the protection plate 20 at the shorter end 20b of the protection plate 20 by a clamping action.

The very high speed of the water jet creates a de-pressurization around the water jet, which leads to suction of particles from the ablated material. Because of the small diameter of the hole 23 of the protection plate 20, the air which is sucked towards the water jet due to the de-pressurization flows through the two openings 15a and 15b and not through the hole 23. But no ablated material will find its way through these openings 15a and 15b and therefore it cannot reach the opening 5 of the coupling unit CU or the conical outlet 15 of the channel 11.

FIGS. 3a to 3c show the steps to make the hole 23 in the protection plate 20. As it is shown in FIG. 3a, the protection plate 20 is initially a single blind thin plate, without the hole 23 in its centre, when it is mounted to the protection chamber 10. First the protection plate 20 is fixed to the bottom of the protection chamber 10 by the two screws 21 and 22.

Secondly, as shown in FIG. 3b, a water jet WJ guided laser beam LB is switched on. It propagates along the optical axis OA and passes the protection chamber 10 through the channel 11. The laser beam LB immediately drills the hole 23 into the protection plate 20 exactly at the correct position, in line with the channel 11 and the optical axis OA as it is shown in FIG. 3c ("in-situ" drilling). Nevertheless any water from the water jet WJ repelled by the protection plate 20 before the hole 23 is drilled, can leave the space between the protection plate 20 and the conical outlet 15 of the protection chamber 10 by the two openings 15a and 15b. The hole 23 after the drilling has a diameter which is about 10% larger than the diameter of the water jet WJ and it does not influence the flow dynamics of the water jet WJ. Now, the coupling unit CU together with the protection chamber 10 and the protection plate 20 is immediately ready for cutting; no further alignments are needed or other arrangements have to be taken.

For drilling the hole 23 the water pressure (of the water pump feeding the coupling unit CU) is set to the value corresponding to the real process operating conditions. Further the optical alignment of the laser beam LB with respect to the opening 5 of the coupling unit CU is performed in the same way as it is done without any protection plate 20. The laser parameters (i.e. pulse repetition rate, average power etc) are set to the values corresponding to the real processing conditions.

The protection plate 20 provides an additional protection to the coupling unit CU against contamination with ablated materials. Further it protects the coupling unit CU from back-reflected laser/plasma light.

Although the preferred embodiment shows a protection chamber attached to a specific coupling unit, where the water jet is surrounded by a gas jacket, the invention is not limited to such a specific coupling unit CU. According to the invention a protection chamber can be attached to any coupling unit with a laser beam guided in a water jet as its output. The water jet does not have to be surrounded by a gas jacket.

A laser head protected by a protection chamber and a protection shield according to the invention works especially well for cutting hard materials. However, very good results are also achieved when cutting soft materials like brass or copper.

The thickness of the protection shield is mainly limited on one side by the minimum stiffness required to mount it: On one hand, if it is too thin the protection plate becomes too flexible and can not be handled easily. On the other hand, it is limited by the time to drill a hole into the shield by the laser beam: If it is too thick it takes too long for the laser beam LB to drill the hole 23 into it. The thickness is preferably selected in such a way that the drilling time is less than a second (e.g. 0.1-0.5 seconds).

The protection chamber as well as the protection shield can be used separately. If a protection shield is used without a protection chamber then the protection shield will be attached directly to the bottom of the coupling unit in front of its output. In this case an open chamber should be formed between the output of the coupling unit and the protection shield. In this way the water can flow away before the hole is drilled.

In addition to using the protection shield without the protection chamber or vice versa the invention is still not limited to the coupling unit described in the example. This especially means that a gas jacket around the water jet is indeed preferable but not essential at all.

The shape of the protection shield does not have to be rectangular. Other shapes are possible. In particular circular, oval- or square-shaped protection shields are applicable. This includes special forms due to the mechanism with which a protection plate is fixed to a protection chamber or a laser head. Rectangular shapes have the advantage that they are very cheap to produce.

The protection shield can be attached to the protection chamber or the coupling unit in different ways. Instead of screws it is possible to use a click or snap-mechanism, where the protection shield is held in place once it is inserted. Also it is possible to solder or clue the protection shield to the protection chamber or laser head, or make them as one piece. In this case the hole will be drilled into the protection shield at the time of its first use, as well. If the protection shield is fixed permanently to the protection chamber or laser head, it can only be replaced together with the protection chamber or laser head, respectively. The protection shield should be attached in such a way that it cannot move or misalign during operation.

In the case the diameter of the hole of the protection shield becomes too big, it is possible instead of replacing the protection shield to move the protection shield sideways in that way that the existing hole is off centre of the optical axis of the water jet/laser beam. Then the method of drilling a new hole is applied similarly as there would be a new protection shield.

Further also a flat steel plate is probably the simplest embodiment of the protection shield different geometries, plate like or bulky, are imaginable. The shield might be structured for example to fit to the coupling unit or protection chamber, respectively when one is used. Further it is imaginable that an area around where the hole will be drilled into the protection shield, is thinner that the rest. In this way the hole can easily be drilled with the laser beam, whereas the thicker area further away from the hole provides enough stability for the protection shield.

Further to improve the performance of the laser head, it is possible to cool focusing lenses, which focus the laser beam into the water jet. The lenses can be cooled by a liquid, in particular water, or by gas. The cooling of the lens can either be done indirectly by cooling the lens holder or directly by cooling at least one surface of the lenses.

The invention claimed is:

1. Process for improving reliability of a machining process for a work piece, said machining process comprising the steps of
   a) launching a transparent liquid jet (WJ) along an optical axis (OA) to the work piece by means of expulsion of liquid through a nozzle (3) of a machine head (LH),
   b) coupling a laser beam (LB) into said liquid jet (WJ) by means of a coupling unit so as to generate a liquid jet guided (WJ) laser beam (LB),
   c) machining said work piece by said liquid jet (WJ) guided laser beam (LB),
   wherein the process for improving reliability comprises the steps of:
   d) fixing a blind protection shield blank (20) to a front of the machine head (LH) prior to launching said transparent liquid jet (WJ),
   e) generating said liquid jet (WJ) guided laser beam (LB) and impinging it on the blind protection shield blank (20),
   drilling a transit-hole (23) into the blind protection shield blank (20) by means of the liquid jet (WJ) guided laser beam (LB), said transit-hole (23) having a minimal size for allowing the liquid jet (WJ) guided laser beam (LB) to transit without hindrance.

2. Process according to claim 1, wherein the step of machining said work piece follows the step of drilling the transit-hole (23) substantially without interruption.

3. Process according to claim 1, comprising the step of cooling a focussing lens system (2) which focuses the laser beam (LB) into said coupling unit thereby stabilizing the laser beam (LB) with respect to the liquid jet (WJ).

4. Process according to claim 1, comprising the step of
   a) surrounding the transparent liquid jet (WJ) guided laser beam (LB) with a gas jet in a first chamber (4) after the nozzle (3) and
   b) transmitting the transparent liquid jet (WJ) guided laser beam (LB) surrounded with said gas jet though a second chamber (10).

5. Apparatus for machining a work piece by means of a liquid jet (WJ) guided laser beam (LB) comprising:
   a) a machine head (LH) with a coupling unit for coupling a laser beam (LB) into a liquid jet (WJ) to generate the liquid jet (WJ) guided laser beam (LB),
   b) an outlet (5) in the machine head through which the liquid jet (WJ) guided laser beam (LB) leaves the machine head (LH) for machining the work piece,
   c) a protection shield (20) replaceably fixed to the machine head (LH) and mounted at a distance from said outlet (5),
   wherein
   d) the protection shield (20) is a blind plate without a hole in its centre.

6. Apparatus for machining a work piece by means of a liquid jet (WJ) guided laser beam (LB) comprising:
   a) a machine head (LH) with a coupling unit for coupling a laser beam (LB) into a liquid jet (WJ) to generate the liquid jet (WJ) guided laser beam (LB),
   b) an outlet (5) in the machine head through which the liquid jet (WJ) guided laser beam (LB) leaves the machine head (LH) for machining the work piece,
   c) a protection shield (20) replaceably fixed to the machine head (LH) and mounted at a distance from said outlet (5) and having a transit-hole (23) for passage of the laser beam (LB) guiding liquid jet (WJ),
   wherein
   d) said transit-hole (23) is formed by:
      d1) fixing a blind protection shield blank (20) to a front of the machine head (LH) prior to launching said liquid jet guided laser beam (WJ),
      d2) generating said liquid jet (WJ) guided laser beam (LB) and impinging it on the blind protection shield blank (20),
      d3) drilling a transit-hole (23) into the blind protection shield blank (20) by means of the liquid jet (WJ) guided laser beam (LB), said transit-hole (23) having a minimal size for allowing the liquid jet (WJ) guided laser beam (LB) to transit without hindrance.

7. Apparatus according to claim 5 or 6, characterized in that the protection shield (20) is made of steel and in that the protection shield (20) is a protection plate and has a thickness of at most 0.3 mm.

8. Apparatus according to claim 5 or 6, characterized in that the machine head (LH) comprises a nozzle (3) for generating said liquid jet (WJ) which has a diameter between 20 and 150 µm.

9. Apparatus according to one of claim 5 or 6, characterized in that the protection plate (29) is fixed by screws (21, 22) to the machine head (LH).

10. Apparatus according to claim 5 or 6, characterized in that the coupling unit comprises a liquid jet nozzle (3), a first chamber (4) mounted adjacent to and downstream of the liquid jet nozzle (3), said first chamber (4) having an inlet for the liquid jet (WJ) guided laser beam (LB), an inlet for gas and a gas nozzle outlet for surrounding the liquid (WJ) guided laser beam (LB) with a gas jacket.

11. Apparatus according to claim 5 or 6, characterized in that the coupling unit comprises a liquid chamber having an entry window for the laser beam and a liquid jet nozzle (3) with a predetermined diameter for generating the liquid jet (WJ), said liquid jet nozzle (3) being arranged opposite to the entry window.

12. Apparatus according to claim 5 or 6, characterized in that it comprises a protection chamber (10) arranged adjacent to and downstream of the first chamber (4), said protection chamber (10) being flat and vented at peripheral walls.

13. Apparatus according to claim 5 or 6, characterized in that said protection chamber (10) has a funnel part having its narrow end (17) directed upstream with respect to the transparent liquid jet (WJ) guided laser beam (LB) and its wide end being directed downstream and being followed by a channel (11).

14. Apparatus according to claim 5 or 6, characterized in that the protection chamber (10) has a depth parallel to the direction of the transparent liquid jet (WJ) guided laser beam (LB) of between 5-10 mm.

15. Apparatus according to claim 5 or 6, characterized in that the front end face (15) of the protection chamber (10) is cone-shaped and that the protection plate is fixed to the open end and that an open space is provided to the side of the plate.

16. Apparatus according to claim 5 or 6, characterized in that a focussing lens system (2) for focussing the laser beam (LB) into the opening of the nozzle (3) is provided with a cooling system.

17. Apparatus according to claim 5 or 6, characterized in that the cooling system provides temperature stabilization to the periphery or the front face of the lens system (2).

* * * * *